United States Patent [19]

Sanderson

[11] Patent Number: 5,660,723

[45] Date of Patent: Aug. 26, 1997

[54] WATER CONSERVING COOLING TOWER SYSTEM

[75] Inventor: Charles H. Sanderson, Fort Wayne, Ind.

[73] Assignee: Superior Manufacturing Company, Fort Wayne, Ind.

[21] Appl. No.: 538,018

[22] Filed: Oct. 2, 1995

[51] Int. Cl.$^6$ .......................... B01D 35/00; B01D 35/06
[52] U.S. Cl. .................. 210/90; 210/138; 210/195.1; 210/257.1; 210/222; 210/223; 210/167
[58] Field of Search ....................... 210/695, 202, 210/167, 222, 223, 195.1, 257.1, 294, 241, 194, 90, 805, 138

[56] References Cited

U.S. PATENT DOCUMENTS

| | | | |
|---|---|---|---|
| 3,510,890 | 5/1970 | Estabrook | 210/107 |
| 4,110,218 | 8/1978 | Marriot et al. | 210/223 |
| 4,347,133 | 8/1982 | Brigante | 210/223 |
| 4,485,012 | 11/1984 | Ehresmann | 210/223 |
| 5,114,571 | 5/1992 | Dier et al. | 210/223 |
| 5,145,585 | 9/1992 | Coke | 210/223 |
| 5,443,719 | 8/1995 | Johnson et al. | 210/223 |
| 5,466,367 | 11/1995 | Coate et al. | 210/202 |
| 5,540,835 | 7/1996 | Sanderson | 210/167 |

*Primary Examiner*—Ana Fortuna
*Attorney, Agent, or Firm*—Randall J. Knuth

[57] ABSTRACT

A water treatment device for use with cooling towers and heat exchangers includes a pump in fluid communication with the heat exchanger to pump a stream of liquid from the heat exchanger. A hydrocyclone is in fluid communication with the pump and is connected to a collection chamber. A first magnetic liquid treatment unit is in fluid communication with and downstream from the hydrocyclone. A liquid return line is in fluid communication with the first magnetic water treatment unit to permit liquid to flow back to the heat exchanger. A secondary pump is in communication with the collection chamber to pump a stream of liquid and form the secondary circuit. A filter is in fluid communication with the secondary pump while a second magnetic liquid treatment unit is in fluid communication with and downstream from the filter. The secondary pump and filter mechanism is used to filter the heavy solids and particulate matter in the bleed-off or blow-down liquid of the system. This causes clean water, without contaminants, to be returned to the system.

15 Claims, 3 Drawing Sheets

WATER CONSERVING COOLING TOWER SYSTEM

BACKGROUND OF THE INVENTION

1. Field of the invention.

The present invention relates to systems for the treatment of water or liquid within cooling towers, and more particularly, to such systems wherein bleed-off water is ejected from the system.

2. Description of the related art.

A problem which is quite prevalent in heating or cooling systems and apparatus which use large amounts of water, such as boilers, cooling towers and the like, is that of scale buildup on the surfaces which come into contact with the water. This is especially troublesome in areas where the water has a high mineral content so that it is necessary for the water to be "conditioned" either by chemical action or by magnetic water treatment devices.

One such magnetic treatment device for use in a cooling tower is disclosed in U.S. Pat. No. 3,951,807 to Charles H. Sanderson and comprises an elongated magnet having a multiplicity of longitudinally spaced poles encased in a non-magnetic jacket and concentrically positioned within an outer casing made of a magnetic material. The jacketed magnet is centered by means of a pair of stepped collars secured thereto which in turn are centered by means of a pair of flared inserts.

Magnetic treatment devices generally of this type are well known and prevent the buildup of scale by causing the calcium and other minerals present in hard water to form, instead, a loose slurry which can be easily removed from the system by blow-down or flushing. The effectiveness with which the water is treated depends on the intensity of the magnetic field within the treating chamber and the effective length of the chamber itself. Accordingly, it is desirable that the chamber be free of any obstructions which may occupy otherwise available treatment space, and for the water to be directed as many times as possible through the treatment chamber.

Boilers and cooling tower systems conventionally are treated with chemicals for the control of scale buildup. These systems require that portions of the heat conducting liquid containing the accumulated dissolved solids be bled off, i.e. removed, from the system. This bleed-off or blow-down water has in the past been simply flushed down the sewer, thereby increasing the sewer bills for the particular installation while at the same time, necessitating the addition of make-up water to replace the bleed-off water lost from the system. Also in this type of system such chemical treatments associated with the heat conducting liquid are also disposed down the sewer thereby necessitating additional chemicals along with make-up water to be added to the system. This make-up water normally includes dissolved solids, with less total dissolved solids than the concentrated bleed-off water, thereby reducing the overall total dissolved solids. Calcium and other types of minerals in the water will increase in concentration due to the evaporation of water within the cooling tower necessitating another bleed-off of dissolved solids. If the total dissolved solids is allowed to reach a level of concentration higher than the carrying capacity of the water, the dissolved solids will precipitate and cause scale build-up.

What is needed in the art is a system for cooling tower and heat exchange units in which bleed-off or blow down is eliminated, thereby reducing the need for additional make-up water that would inject new particulate matter, solids, and minerals into the cooling tower heat exchange system.

SUMMARY OF THE INVENTION

According to the present invention the system overcomes the disadvantages of the prior art water treatment devices utilized with cooling towers and heat exchangers in that a secondary pump and filter mechanism is used to filter the heavy solids and particulate matter in the bleed-off or blow-down liquid of the system. Thereby, clean water, without contaminants, is returned to the system.

An advantage of the present invention is that the cooling tower water system requires substantially less make-up water as opposed to prior art water conditioning units for cooling towers, thereby water is conserved. Make-up water is reduced only to the amount of cooling water or liquid lost through evaporation or drift. Drift is water or liquid lost from a cooling tower due to wind blowing the liquid out of the tower. This reduction of make-up water created by the present system reduces the cost of sewer service since blow down and subsequent water release are eliminated.

A further advantage of the present invention is that since there is no chemical usage and no drainage or waste liquid given off by the system, governmental permits for the discharge of chemicals are not needed, thereby presenting no government compliance problems.

Another advantage of the present invention is that the water lost through evaporation or drift is environmentally benign since no chemicals are used to remove heat exchanger scale and corrosion in the system itself.

Yet another advantage of the present invention is that by reducing make-up water needs, a reduction takes place in the need for adding water or liquid to the system that may contain minerals such as iron and calcium. These minerals are known to reduce the heat transfer efficiency of the heat exchangers within the cooling tower. By eliminating this input of minerals, higher heat transfer efficiencies are produced within the cooling system.

A further advantage of the present invention is that by continuously removing the precipitated solids from the system before entry into the magnetic treatment unit, an increased effect on the water passing through the magnetic unit is shown.

The invention comprises, in one form thereof, a liquid treatment system for heat exchanger systems. The treatment system includes a pump in fluid communication with the heat exchanger to pump a stream of liquid from the heat exchanger. The pump is in fluid communication with a hydrocyclone with a collection chamber. A first magnetic liquid treatment unit is in fluid communication with and downstream from the hydrocyclone. A liquid return line is in fluid communication with the first magnetic water treatment unit to permit liquid to flow back to the heat exchanger. A secondary pump is in communication with the collection chamber to pump a stream of liquid and form the secondary circuit. A filter is in fluid communication with the secondary pump while a second magnetic liquid treatment unit is in fluid communication with and downstream from the filter. A second liquid return line is in fluid communication with the second magnetic liquid treatment unit to selectably transport liquid back to one of the secondary pump and the heat exchanger.

The invention comprises, in another form thereof, a water treatment system for cooling towers. The treatment system includes a pump that is in fluid communication with the cooling tower to pump a stream of water containing minerals from the cooling tower and a hydrocyclone is in fluid communication with said pump. The hydrocyclone is connected to a collection chamber. A first magnetic water treatment unit is in fluid communication with and downstream from the hydrocyclone while a a water return line is in fluid communication with the first magnetic water treatment unit to permit water to flow back to the cooling tower.

A secondary pump is also in communication with the collection chamber to pump a stream of water. A filter is used in fluid communication with said secondary pump to filter precipitated minerals, while a second magnetic water treatment unit is in fluid communication with and downstream from the filter. A reservoir tank is in fluid communication with second liquid return line and includes a barrier wall separating the tank into a primary portion and a secondary portion. The primary portion is in fluid communication with the secondary pump, while a sump pump is in fluid communication with the secondary portion to communicate fluid out of the reservoir tank back to the cooling tower. The second liquid return line empties into the primary portion, whereby liquid in the primary portion is permitted to drain back to said secondary pump.

The invention comprises, in a further form of the invention, a reservoir tank for liquid conserving cooling tower systems utilizing liquid. The reservoir includes a tank capable of containing liquid and a barrier wall separating the tank into a primary portion and a secondary portion without fully separating the tank. A sump pump is disposed in the secondary portion to communicate liquid in the secondary portion out of the tank, whereby the barrier permits a certain volume of liquid to be held in the tank primary portion but permits the liquid to pass over the barrier wall into the secondary portion on an increased volume of liquid.

The invention comprises, in yet another form thereof, of a liquid treatment system for heat exchanger systems. The treatment system includes a pump in fluid communication with the heat exchanger to pump a stream of liquid from the heat exchanger. A filter is in fluid communication with the pump while a magnetic liquid treatment unit is in fluid communication with, and downstream from, the filter. A liquid return line is in fluid communication with the magnetic water treatment unit to permit liquid to flow back to the heat exchanger.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENT

Figure 1:
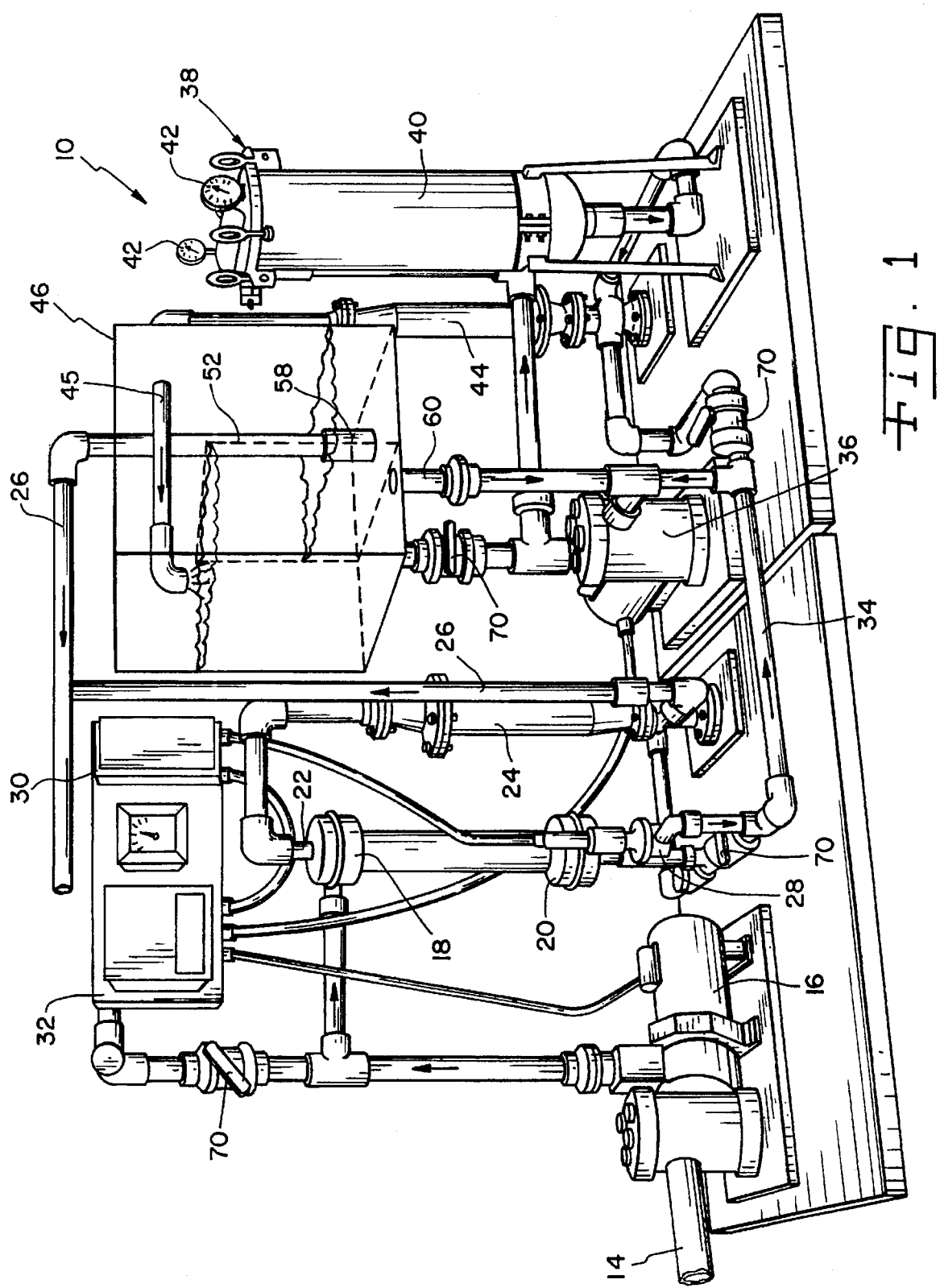
FIG. 1 is a perspective view of one form of the present invention.
Figure 2:
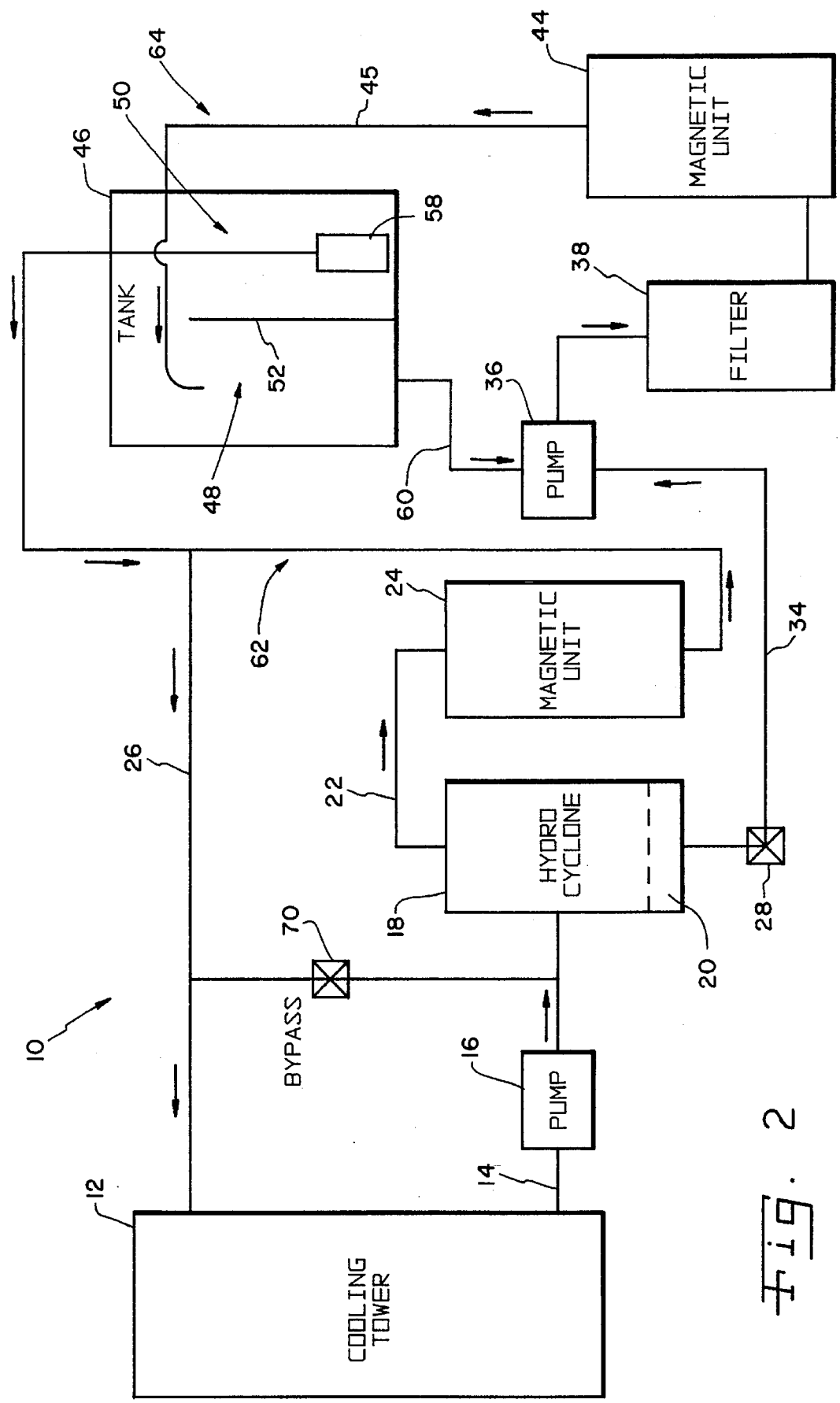
FIG. 2 is a diagrammatic flowchart of the system.

Referring now to the drawings and particularly to FIG. 1, there is shown a water conserving cooling tower water treatment system 10 of the present invention. The flow of water through system 10 is more particularly shown in FIG. 2. Although the term water is used throughout the specification, since it is the preferred heat transfer liquid, the system may be utilized with other types of heat transfer liquids, and the term water is defined to also include heat transfer liquids other than $H_2O$.

The system 10 is for use with generally large types of cooling towers or heat exchangers normally utilized at factories and municipal utilities. However, the system of the present invention can work effectively on almost any size of heat exchanger system having accumulations of scale that need to be removed.

System 10 pulls water from the bottom of the sump of a cooling tower 12 (FIG. 2) or of a similar heat exchanging system. This water normally contains various precipitated solids and/or suspended solids therein, which are known to reduce the efficiency of the heat transfer capacity of the heat exchanger such as cooling tower 12.

System 10 in overview utilizes a hydrocyclone system 18 to centrifugally spin water to remove suspended solids. The water without the suspended solids is then magnetically treated and sent back to the cooling tower system 12 (the primary circuit 62). Water and highly concentrated suspended solids from the output of the hydrocyclone 18 are sent to another subsystem (the secondary circuit 64) in which the water is filtered and further magnetically treated to thereby remove virtually all the suspended solids and other particulate matter within the water. The ultra filtrated water is then sent back to cooling tower 12.

Shown more particularly in FIG. 1, a fluid inlet pipe 14 is connected to a pump 16 for pumping water from the bottom of cooling tower 12 into system 10. The water is accelerated by pump 16 and injected into a hydrocyclone 18. This hydrocyclone 18 is of the type of a vortex separator which causes the water to spin therein, thereby causing suspended solids to separate from the water and fall to the bottom of hydrocyclone unit 18. Water containing the majority of the suspended solids is captured in a collection chambers 20 at the bottom of hydrocyclone 18. Hydrocyclone 18 is preferably one from Lakos Company of Fresno, Calif. Model No. 1L, although other types of hydrocyclones may be utilized. The water leaving hydrocyclone 18 through outlet 22 is routed into a magnetic water treatment unit 24 to be described below.

The magnetic water control unit 24 of the system is used to control lime and scale corrosion in the cooling tower and related systems. The particular structure and methods of construction of unit 24 is shown, e.g., in U.S. Pat. Nos. 3,951,807, 4,050,426, 4,153,559, 4,299,700, 4,320,003, 4,357,237, and 4,430,785, owned by the assignee of the present invention and explicitly hereby incorporated by reference. The magnetic liquid treatment units apply magnetic fields of alternating polarity to liquid passing thereby and therethrough. The water that has been so magnetically treated is then returned to cooling tower 12 via water return pipe 26.

A valve, such as a motorized ball valve or solenoid valve 28 is connected to an output of collection chamber 20. This solenoid valve 28 is controlled by a timer switch 30 (FIG. 2) along a control panel 32 which controls various elements of system 10, particularly the pumps 16, 36 and solenoid valve 28. Once control panel 32 opens solenoid valve 28, system 10 purges the concentrated solids from collection chamber 20 into a pump inlet line 34. Pump inlet line 34 is in fluid communication with a secondary pump 36 which also is controlled by control panel 32. Secondary pump 36 pressurizes the water from pump inlet line 34 and supplies it to a sock filter unit 38.

Sock filter unit 38 includes a sock filter housing 40 which contains a sock filter (not shown). The sock filter utilized in this system is preferably of the 10 micron filter type, although other types may be utilized to remove flocculated minerals and loose pieces of scale from within the cooling system stream. Such a sock filter and housing is available from Filtration Systems, Inc. of Sunrise, Fla. although other types of filters and filter housings may be utilized. Sock filter unit 38 also includes two pressure gages 42 which registers a change in differential pressure to indicate 5 filter therein to change the filter therein. After the water has passed through sock filter unit 38, water is passed through another water magnetic treatment unit 44 of the type previously described, but a smaller capacity magnetic treatment unit may be utilized.

Figure 3:
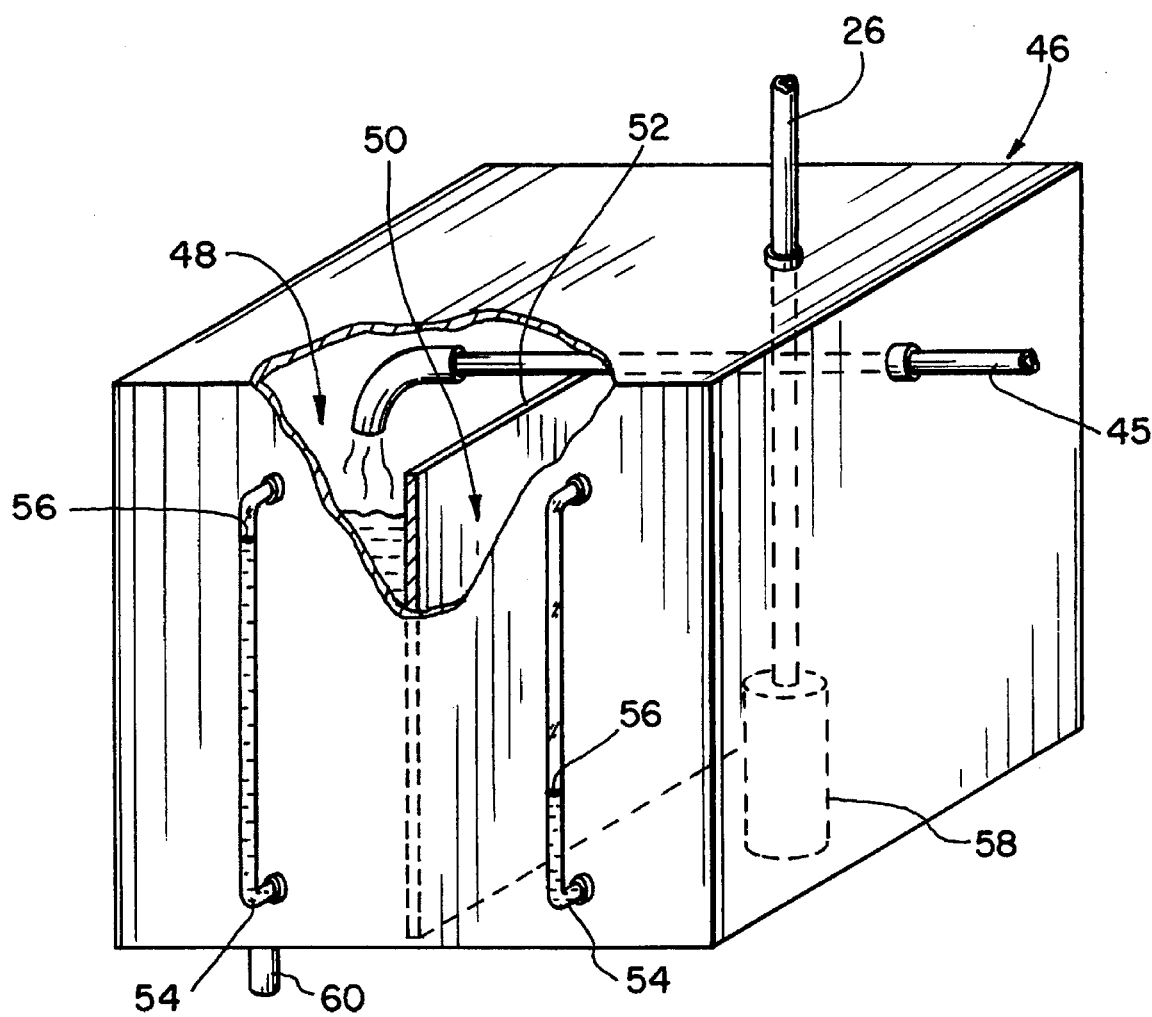
FIG. 3 is a fragmentary, perspective view of the water reservoir tank of the system.

Reservoir tank 46 as shown in FIG. 3 includes a primary portion or side 48 and a secondary portion or side 50, each able to contain a volume of liquid. A barrier wall 52 is vertically mounted within the tank to separate reservoir tank 46, thereby separating primary side 48 from secondary side 50. Reservoir tank 46 may be constructed from glass or plexiglass to enable an operator to view the water level within each side 48, 50. Preferably tank 46 is constructed of polypropylene to reduce weight and cost although visibility is restricted.

Each side 48, 50 includes a vertically oriented sight glass or display tube 54 in communication with the particular side 48, 50 on the front of reservoir tank 46. Each of these display tubes 54 is in communication with a portion of liquid within each particular side 48, 50, thereby allowing an operator to view the liquid level within tank 46 from the outside of tank 46. Externally mounted display tubes 54 include a volume of water having a level 56 equal to the liquid level within each side 48, 50. Utilizing display tubes 54, an operator can ascertain whether system 10 is operating correctly.

As shown in FIG. 3, outlet 45 from magnetic unit 44 empties into primary side 48 of reservoir tank 46. A sump pump 58 is disposed within the bottom of reservoir tank 46 in secondary side 50. Sump pump 58 conducts any liquid above a certain level in secondary side 50 back to water return pipe 26, thereby returning that water to the cooling tower 12.

Reservoir tank 46 further includes a primary return 60. Primary return 60 connects between primary side 48 and secondary pump 36. As can be seen more clearly in FIG. 2, the secondary water circuit 64 of the system is utilized for filtering the highly concentrated resultant flocculated minerals and water out of hydrocyclone 18 via water pump inlet 34. Secondary water circuit 64 includes secondary pump 36 which pumps the liquid (water and solids) through filter 38 so that it passes through the magnetic unit 44 up into the primary side 48 of reservoir tank 46. The water level within tank 46 is not normally above barrier wall 52. The liquid therein stays within primary side 48 until pump 36 suctions that liquid through water return 60 and pumps it back into filter housing 38 to again filter the water. The continuous pumping action of the secondary water circuit is called constant filtration.

System 10 may include other plumbing arrangements such as bypass valves 70 (FIG. 1) and other auxiliary lines to enable bypassing particular sections of system 10 during maintenance. Additionally, these bypass valves 70 (FIG. 2) may be utilized to assure proper velocity control of the coolant water through the magnetic water conditioners. Pump 16 is normally oversized since various installations may have different coolant water head pressures. By varying the flow of water through bypass valve 70 (FIG. 2) the optimum flow of water may be created through systems 10 regardless of the applied coolant water head pressure.

In operation, water from cooling tower 12 contains large and heavy suspended solids. This water will be evacuated or pumped from cooling tower 12 by pump 16 through a fluid inlet pipe 14 into hydrocyclone 18. Hydrocyclone 18 accelerates the water into a centrifugal vortex separator at a high velocity. This causes two things, namely: 1) the large and heavy solids are forced into the collection chamber 20 at the bottom of the hydrocyclone unit 18; and 2) substantially clear water is allowed to exit through the top outlet 22 into a magnetic water treatment unit 24. The water which is free of separable solids passes through the magnetic water treatment unit 24 in which dissolved minerals flocculate into sizable particles (see above referenced patents). By locating the hydrocyclone up stream from the magnetic water treatment unit 24, increased effectiveness of the unit is observed. During the constant cycling process, the newly formed solids are centrifugally spiraled through hydrocyclone 18 and accumulate in the collection chamber 20. Water exits out of magnetic water treatment unit 24 back into a water return pipe 26 to cooling tower 12. This completes primary water circuit 62.

The residue containing the heavy solids and flocculated minerals within collection chamber 20 is intermittently flushed and removed by action of control panel 32 and pump 36, pumping such heavy solids and liquids through pump inlet line 34 into secondary water circuit 64. Pump 36 particularly pumps liquid first into filter unit 38 in which solids above 10 microns in size are removed. Water is allowed to flow through and to magnetic unit 44 and into reservoir tank 46 on primary side 48. If pump 36 is not taking sludge and water from hydrocyclone 18, it is continuously pumping water and dissolved solids from the primary side 48 of tank 46 back through filter 38 and magnetic filter 44, thereby continuously filtering and collecting the water within secondary water circuit At particular instances when pump 36 via control panel 32 and solenoid 28 cause the water and solids within the collection chamber 20 to be suctioned into pump 36 an increase in the volume of liquid within secondary water circuit 64 develops. At this time, substantially clear and clean liquid will overfill primary side 48 and flow over barrier wall 52 into secondary side 50. The height of barrier wall 52 maintains an adequate supply of liquid in secondary water circuit 64. The water that has overflown barrier wall 52 into secondary side 50 is then automatically suctioned through a sump pump 58 back into water return pipe 26 and cooling tower 12. In this fashion, all the liquid purged from cooling tower 12 is returned to the system as opposed to prior art systems where the water from a collection chamber 20 was flushed away or disposed of, requiring additional make-up water containing contaminants to be injected into cooling tower system 12.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A liquid treatment system for heat exchanger systems, said treatment system comprising:

a pump in fluid communication with the heat exchanger to pump a stream of liquid from the heat exchanger;

a hydrocyclone in fluid communication with said pump, said hydrocyclone connected to a collection chamber;

a first magnetic liquid treatment unit in fluid communication with and downstream from said hydrocyclone;

a liquid return line in fluid communication with said first magnetic water treatment unit to permit liquid to flow back to the heat exchanger;

a secondary pump in communication with said collection chamber to pump a stream of liquid;

a filter in fluid communication with said secondary pump;

a second magnetic liquid treatment unit in fluid communication with and downstream from said filter; and a second liquid return line in fluid communication with said second magnetic liquid treatment unit to selectably transport liquid back to one of said secondary pump and said heat exchanger.

2. The treatment system of claim 1 further comprising a solenoid valve disposed between said collection chamber and said secondary pump, and a control panel connected to both said pumps and said solenoid valve to control system operation.

3. The treatment system of claim 2 in which said control panel controls said pumps and said solenoid based on a pre-set timer.

4. The treatment system of claim 1 in which said filter comprises a sock filter.

5. The treatment system of claim 1 in which said filter filters particles in said liquid down to at least 10 microns.

6. The treatment system of claim 1 in which a pressure sensing device is operatively associated with said filter, said device detecting a pressure differential to indicate said filter is clogged.

7. The treatment system of claim 1 further comprising a reservoir tank in fluid communication with said second liquid return line, said reservoir tank including a barrier wall separating said tank into a primary portion and a secondary portion, said primary portion in fluid communication with said secondary pump, and a sump pump in fluid communication with said secondary portion to communicate fluid out of said reservoir tank back to the heat exchanger, said second liquid return line emptying into said primary portion, whereby liquid in said primary portion at times drains back to said secondary pump.

8. The treatment system of claim 7 in which said sump pump is located in said secondary portion of said reservoir tank.

9. The treatment system of claim 1 in which said first and second magnetic liquid treatment units apply magnetic fields of alternating polarity to liquid passing thereby.

10. A water treatment system for cooling towers, said treatment system comprising:

a pump in fluid communication with the cooling tower to pump a stream of water containing minerals from the cooling tower;

a hydrocyclone in fluid communication with said pump, said hydrocyclone connected to a collection chamber;

a first magnetic water treatment unit in fluid communication with and downstream from said hydrocyclone;

a water return line in fluid communication with said first magnetic water treatment unit to permit water to flow back to the cooling tower;

a secondary pump in communication with said collection chamber to pump a stream of water;

a filter in fluid communication with said secondary pump, a second magnetic water treatment unit in fluid communication with and downstream from said filter;

a reservoir tank in fluid communication with said second liquid return line, said reservoir tank including a barrier wall separating said tank into a primary portion and a secondary portion, said primary portion in fluid communication with said secondary pump, and a sump pump in fluid communication with said secondary portion to communicate fluid out of said reservoir tank back to the cooling tower, said second liquid return line emptying into said primary portion, whereby liquid in said primary portion is permitted to drain back to said secondary pump.

11. The treatment system of claim 10 further comprising a solenoid valve disposed between said collection chamber and said secondary pump; and a control panel connected to both said pumps and said solenoid valve to control system operation.

12. The treatment system of claim 10 in which said filter is a sock filter.

13. The treatment system of claim 10 in which said secondary pump operates to filter water in said tank more than once prior to release back to the cooling tower.

14. The treatment system of claim 10 in which said sump pump is located in said secondary portion of said reservoir tank.

15. The treatment system of claim 10 in which said magnetic liquid treatment units apply magnetic fields of alternating polarity to water passing thereby.

* * * * *